United States Patent
Schulz et al.

(10) Patent No.: US 8,692,656 B2
(45) Date of Patent: Apr. 8, 2014

(54) INTRINSIC FLUX SENSING

(75) Inventors: Volkmar Schulz, Wuerselen (DE); Matthias Wendt, Wuerselen (DE); Christoph Martiny, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1122 days.

(21) Appl. No.: 12/516,027

(22) PCT Filed: Nov. 27, 2007

(86) PCT No.: PCT/IB2007/054801
§ 371 (c)(1),
(2), (4) Date: May 22, 2009

(87) PCT Pub. No.: WO2008/065607
PCT Pub. Date: Jun. 5, 2008

(65) Prior Publication Data
US 2010/0045478 A1     Feb. 25, 2010

(30) Foreign Application Priority Data
Nov. 30, 2006   (EP) ..................................... 06125104

(51) Int. Cl.
*G08C 19/16* (2006.01)
(52) U.S. Cl.
USPC ....................................................... 340/12.1
(58) Field of Classification Search
USPC ................. 340/825, 825.71, 825.72, 825.69, 340/825.22, 545.3, 578, 4.11, 12.22; 341/176; 315/291, 222, 316; 362/233, 362/394, 612, 555; 235/462.42
See application file for complete search history.

(56) References Cited

U.S. PATENT DOCUMENTS

| | | | |
|---|---|---|---|
| 5,654,709 A * | 8/1997 | Miyashita | 341/122 |
| 5,932,861 A * | 8/1999 | Iwaguchi et al. | 235/455 |
| 6,389,337 B1 * | 5/2002 | Kolls | 701/29 |
| 6,455,340 B1 | 9/2002 | Chua et al. | |
| 6,548,967 B1 * | 4/2003 | Dowling et al. | 315/318 |
| 7,355,523 B2 * | 4/2008 | Sid | 340/9.16 |
| 2002/0071161 A1 * | 6/2002 | Perkins et al. | 359/154 |
| 2002/0133282 A1 * | 9/2002 | Ryan et al. | 701/70 |
| 2003/0043972 A1 | 3/2003 | Burnham et al. | |
| 2004/0105261 A1 * | 6/2004 | Ducharme et al. | 362/231 |
| 2004/0105264 A1 | 6/2004 | Spero | |
| 2004/0208632 A1 * | 10/2004 | Dietz et al. | 398/182 |
| 2004/0239923 A1 * | 12/2004 | Adams et al. | 356/317 |
| 2005/0058223 A1 * | 3/2005 | Tanaka | 375/316 |
| 2005/0231381 A1 * | 10/2005 | Pederson et al. | 340/815.45 |
| 2005/0243549 A1 * | 11/2005 | Ruston | 362/233 |
| 2005/0269480 A1 * | 12/2005 | Ford et al. | 250/200 |
| 2005/0280375 A1 * | 12/2005 | Chikugawa et al. | 315/291 |
| 2006/0028156 A1 | 2/2006 | Jungwirth | |
| 2007/0003289 A1 * | 1/2007 | Tan et al. | 398/164 |

FOREIGN PATENT DOCUMENTS

| | | |
|---|---|---|
| DE | 4327173 A1 | 2/1995 |
| EP | 1633060 A1 | 3/2006 |
| GB | 2149947 A | 6/1985 |
| WO | 9831182 A1 | 7/1998 |
| WO | 2004034610 A1 | 4/2004 |

* cited by examiner

*Primary Examiner* — Vernal Brown
(74) *Attorney, Agent, or Firm* — John Salazar; Mark Beloborodov

(57) ABSTRACT

According to an exemplary embodiment of the present invention, a lighting system for communication with a remote control device is provided, which comprises a light emitting element adapted for emitting modulated light to the remote control and for detecting control signals from the remote control. This may provide for a communication between the remote control and the lighting system without the need of an extra sensor or an extra transmitter.

13 Claims, 3 Drawing Sheets

INTRINSIC FLUX SENSING

The invention relates to the field of lighting systems. In particular, the invention relates to a lighting system for communication with a remote control device, a communication and switching circuit for a lighting system, a remote control device, a method for communication of a lighting system with a remote control device, a computer-readable medium, a processor and a program element.

In order to design a lamp that is able to produce a wide range of colours, light emitting diodes (LEDs) with different colours may be used. These LEDs define an area in the CIE xy-colour-space, which shows the colour that can be realized by the weighted linear combination of these LEDs, which are for example red, green and blue LEDs.

In high-power and high quality LED lamps phosphor-ceramics colour conversion may be a good way for generating the different required colours. However, a simple on/off switch for these devices may not allow the use of all possibilities in these lamps. A remote control may be used for remote controlling of such a multi-colour-LED-lamp. However, in order to detect the control signal from the remote control device, a sensor may have to be implemented into the lighting system. On the other hand such a detector or sensor may not provide bidirectional communication between the lighting system and the remote control device.

It may be desirable to provide for an improved communication between a lighting system and a remote control device.

The invention provides a lighting system for communication with a remote control device, a communication and switching circuit for a lighting system, a method for communication of a lighting system with a remote control device, a processor, a computer-readable medium, a remote control device and a program element with the features according to the independent claims.

According to a first aspect of the present invention, a lighting system for communication with a remote control device is provided, the lighting system comprising a light emitting element and a switching element for switching the light emitting element between a detection mode and an emission mode, wherein, when being in the emission mode, the light emitting element is adapted for emitting light. Furthermore, when being in the detection mode, the light emitting element is adapted for detecting a control signal from a remote control device. Furthermore, the lighting system is adapted for emitting a communication signal to the remote control device.

In other words, the lighting system may be switched between an illumination or emission mode and a detection mode. When being switched to the illumination mode, the lighting system may be used for illuminating its surrounding or for transmitting a communication signal. On the other hand, when being switched to the detection mode, the lighting system may be used for detecting a control signal transmitted from the remote control device. The detection of the control signal is performed by the light emitting element itself. An extra sensor or detector is thus not necessary.

According to an exemplary embodiment of the invention, the light emitting element is adapted for emitting the communication signal to the remote control device. The communication signal may comprise information relating to a working condition of the light emitting element.

Therefore, the light emitting element itself may transmit data to the remote control device. The data relates to, for example, static colour point information, or dynamic colour point information of the light which is emitted by the light emitting element.

Furthermore, the communication signal may, according to another exemplary embodiment of the invention, comprise information about the status of the lamp selected from the group consisting of a dimmer control, a starting point (or switch on time), a stopping point (or switch off time), lamp identification, a use-pattern, lamp diagnosis data, and power consumption.

The use-pattern may comprise the on/off-time of the lamp or information about a preferred colour at a certain time.

According to another exemplary embodiment of the present invention, the control signal comprises items to program the lighting system selected from the group consisting of static colour point information, dynamic colour point information, a dimmer control signal, a start signal, a stop signal, a lamp identification signal and the maximum allowed power consumption of the lamp system.

In other words, the current working condition may be transmitted to the remote control device via the communication signal from the light emitting element. On the other hand, a working condition which has to be met may be transmitted from the remote control device to the light emitting element and therefore to the lighting system. In a following step, this (future) working condition may be set up by the lighting system.

The start signal and the stop signal for example comprise time stamp information for start and stop of a dynamic colour point sequence, respectively. The dynamic colour point information may be adapted for controlling or triggering an individual illumination sequence of the lighting system.

According to another exemplary embodiment of the present invention, the lighting system further comprises a modulation unit adapted for modulating the communication signal according to a modulation scheme.

Therefore, a fast and effective data transmission may be provided from a lighting system to the remote control device.

According to another exemplary embodiment of the present invention, a modulation scheme is selected from the group consisting of pulse width modulation, pulse position modulation, pulse amplitude modulation or pulse density modulation.

According to another exemplary embodiment of the present invention, the lighting system further comprises a transmission unit for emitting the communication signal to the remote control device, wherein the transmission unit comprises a radio frequency transmitter module.

Thus, according to this exemplary embodiment of the present invention, the communication from the lighting system to the remote control device may be performed by an RF downlink. Thus, in case the optical path between the lighting system and the remote control is blocked, communication may still be possible. Furthermore, by transmitting the communication signal via an RF-module, communication by the RF-module and simultaneous illumination by the light emitting element may be provided.

According to another exemplary embodiment of the present invention, the light emitting element is a light emitting diode (LED).

According to another exemplary embodiment of the present invention, the light emitting element comprises one string or several strings of light emitting diodes or a combination of one or several LED string with one or several individual LEDs. Furthermore, the light emitting element may comprise a whole two-dimensional array of light emitting diodes.

According to another exemplary embodiment of the present invention, the lighting system further comprises an amplifier and a driving circuit, wherein the switching element is a Tx/Rx-switch adapted for providing a disconnection of the light emitting element from the driving circuit and a connection to the amplifier.

The expression Tx/Rx-switch is a short form for "transmitt-receive-switch".

According to another aspect of the present invention, a communication and switching circuit for a lighting system is provided, the communication and switching circuit comprising a switching element for switching a light emitting element between a detection mode and an emission mode, a driving circuit for driving the light emitting element such that the light emitting element emits light when being in the emission mode, a sampling circuit for providing a fast sampling of a control signal detected by the light emitting element when being in the detection mode, wherein the communication and switching circuit is adapted for generating a communication signal for a remote control device.

In other words, a communication and switching circuit for a lighting system may be provided, which is adapted for driving a LED for illuminating the surrounding. Furthermore, the circuit is adapted for switching the LED into a detection mode, in which the LED is used for detecting a signal from a remote control device. Therefore, no extra sensor or detector may be necessary for acquisition of the control signal. Furthermore, no extra transmitter for generating a signal which is then transmitted to the remote control device may be necessary.

According to another exemplary embodiment of the present invention, the sampling circuit comprises an amplifier and an analog-to-digital converter.

Furthermore, the communication and switching circuit comprises a processor and a pulse-pattern generator for generating the communication signal.

According to another aspect of the present invention, a method for communication of a lighting system with a remote control device is provided, the method comprising the steps of emitting light by a light emitting element, switching the light emitting element from an emission mode to a detection mode, detecting a control signal from a remote control device by the light emitting element and emitting a communication signal to the remote control device.

Furthermore, according to another exemplary embodiment of the present invention, a computer-readable medium is provided, in which a computer program for communicating with a remote control device is stored which, when being executed by a processor, causes the processor to carry out the above-mentioned method steps.

Furthermore, according to another exemplary embodiment of the present invention, a program element for communicating with a remote control device is provided which, when being executed by a processor, causes the processor to carry out the above-mentioned method steps.

Those skilled in the art will readily appreciate that the method for communication may be embodied as the computer program, i.e. by software, or may be embodied using one or more special electronic optimization circuits, i.e. in hardware, or the method may be embodied in hybrid form, i.e. by means of software components and hardware components.

The program element according to an embodiment of the invention is preferably loaded into working memories of a data processor. The data processor may thus be equipped to carry out embodiments of the methods of the present invention. The computer program may be written in any suitable programming language, such as, for example, C++ and may be stored on a computer-readable medium, such as a CD-ROM. Also, the computer program may be available from a network, such as the WorldWideWeb, from which it may be downloaded into processing units or processors, or any suitable computers.

Furthermore, according to another exemplary embodiment of the present invention, a remote control device for communication with a lighting system is provided, the remote control device comprising a transmitter for emitting a control signal to a lighting system, and a receiver for detecting a communication signal from the lighting system.

It may be seen as the gist of an exemplary embodiment of the present invention that LEDs in a lighting system are used both as photo-sensors for detecting control signals from a remote control (uplink) and as sources for the emission of modulated light to the remote control (downlink) and for illumination. Therefore, a communication between the remote control device and the lighting system may be provided without the need of an extra sensor or an extra transmitter (in the lamp).

This may provide for a remote control technique for a multi-primary-LED-lamp in which the information exchange between the LED-lamp and the remote control is performed using special current and thus light modulation schemes to perform the up- and downlink to and from the device to the remote control. For the reception of commands from the remote control, the LEDs are used as photodiode (intrinsic flux sensing).

Thus, no special sensors are required to perform the up- and downlink. A special circuit may be provided that allows to switch the LEDs into a receive mode in a very rapid way. Therefore, the communication and switching circuit may be used for phosphor converted LEDs as well as for conventional LEDs.

These and other aspects of the present invention will become apparent from and elucidated with reference to the embodiments described hereinafter.

Exemplary embodiments of the present invention will be described in the following, with reference to the following drawings.

The illustration in the drawings is schematic. In different drawings, similar or identical elements are provided with the same reference numerals.

Figure 1:
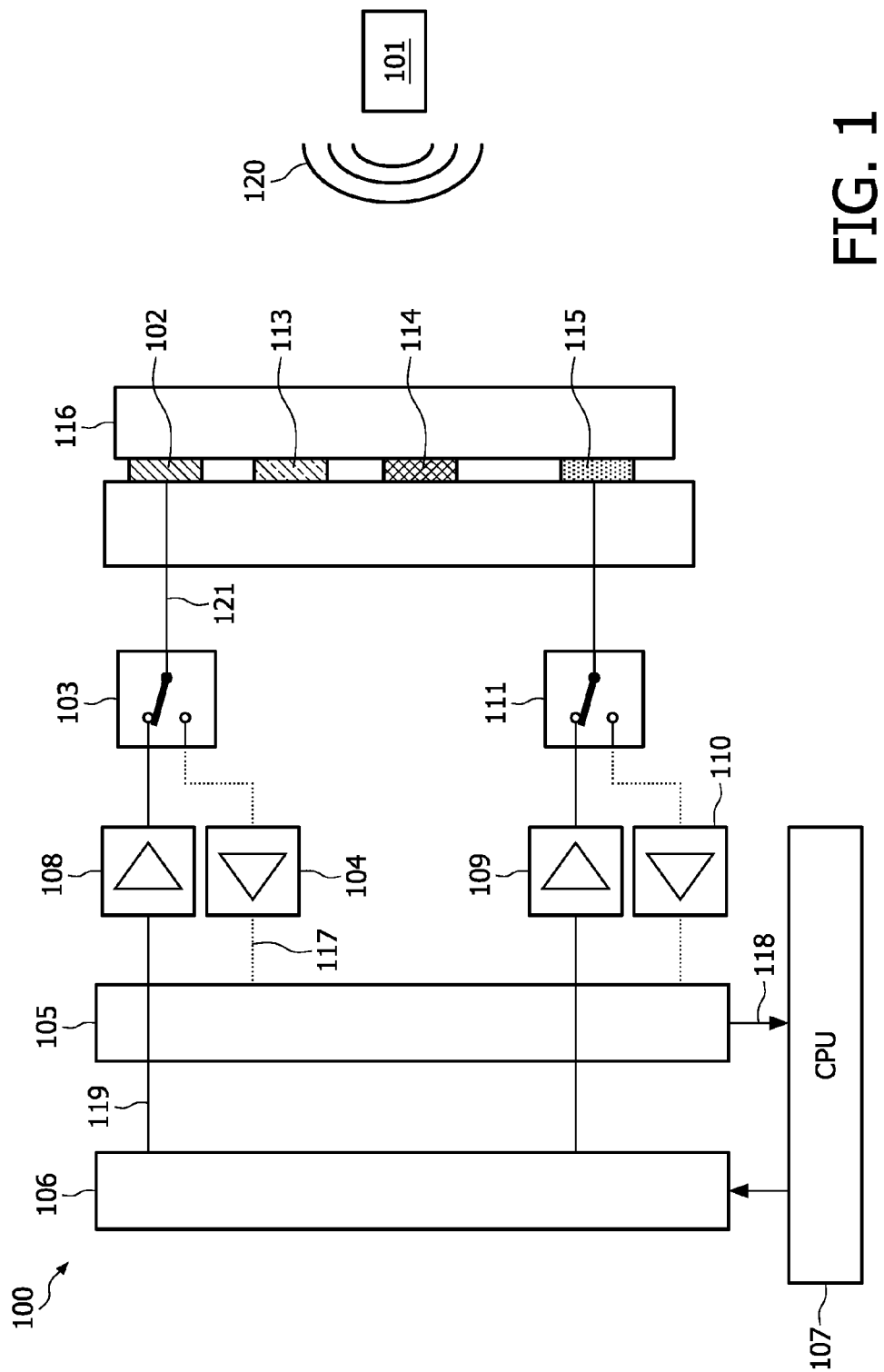
FIG. 1 shows a schematic representation of the building blocks of a lighting system according to an exemplary embodiment of the present invention.

FIG. 1 shows a schematic representation of a lighting system 100, comprising a LED 102 or an LED-string or LED-array 102, 113, 114, 115. The lighting system 100 depicted in FIG. 1 comprises a plurality of channels for different colours or LEDs. In the following, only one channel is described.

The red LED 102 (or string of several LEDs) is connected to an Tx/Rx-switch 103 which allows a disconnection from the driver circuit 106, 107, 108 and a connection to the amplifier 104, which is for example a transimpedance amplifier.

The output 117 of the amplifier 104 is connected to an analog-to-digital converter (ADC) 105 that provides for a very fast sampling of the amplified photo-signal 117.

The digital photo-signal 118 is transmitted to a central processing unit (CPU) 107 or digital signal processing unit (DSP) 107, that may allow to do a colour control, which is for example triggered by the remote control, and the remote control signal extraction.

The CPU 107 is controlling the brightness and the transmission of information via a pulse-pattern generator 106. The output 119 of the pulse-pattern generator 106 is connected to the driver 108 and then (via switch 103) to the LED 102 or to the whole LED-string 102, 113, 114, 115.

Furthermore, an optical element 116 may be arranged in front of the LED-string 102, 113, 114, 115, which may be adapted for filtering or focusing the emitted light or the signal from the remote control 101.

The remote control device 101 is adapted for transmitting a control signal 120 towards the LED-string. After passing the optical element 116, one of the LEDs, for example LED 102, detects the signal 120 from the remote control 101 and transmits the resulting detection signal to the switch 103 via a transmission line 121. The detected signal is then amplified by amplifier 104 and digitized by the analog-to-digital converter 105, after which it is transmitted to the CPU 107.

Other LEDs, for example LED 115, may be connected to another switch 111 and another amplifier 110 for amplification of a detection signal detected by LED 115. Furthermore, the second switch 111 may be connected to a second amplifier 109 connected to the pulse-pattern generator 106.

The LEDs 102, 113, 114, 115 are used as photo-sensors for the uplink, i.e. the channel from the remote control device 101 to the lighting system 100, in order to perform a device selection, an activation or deactivation of the lighting system, or to perform a transmission of other control data from the remote control 101 to the lighting system 100.

Figure 2:
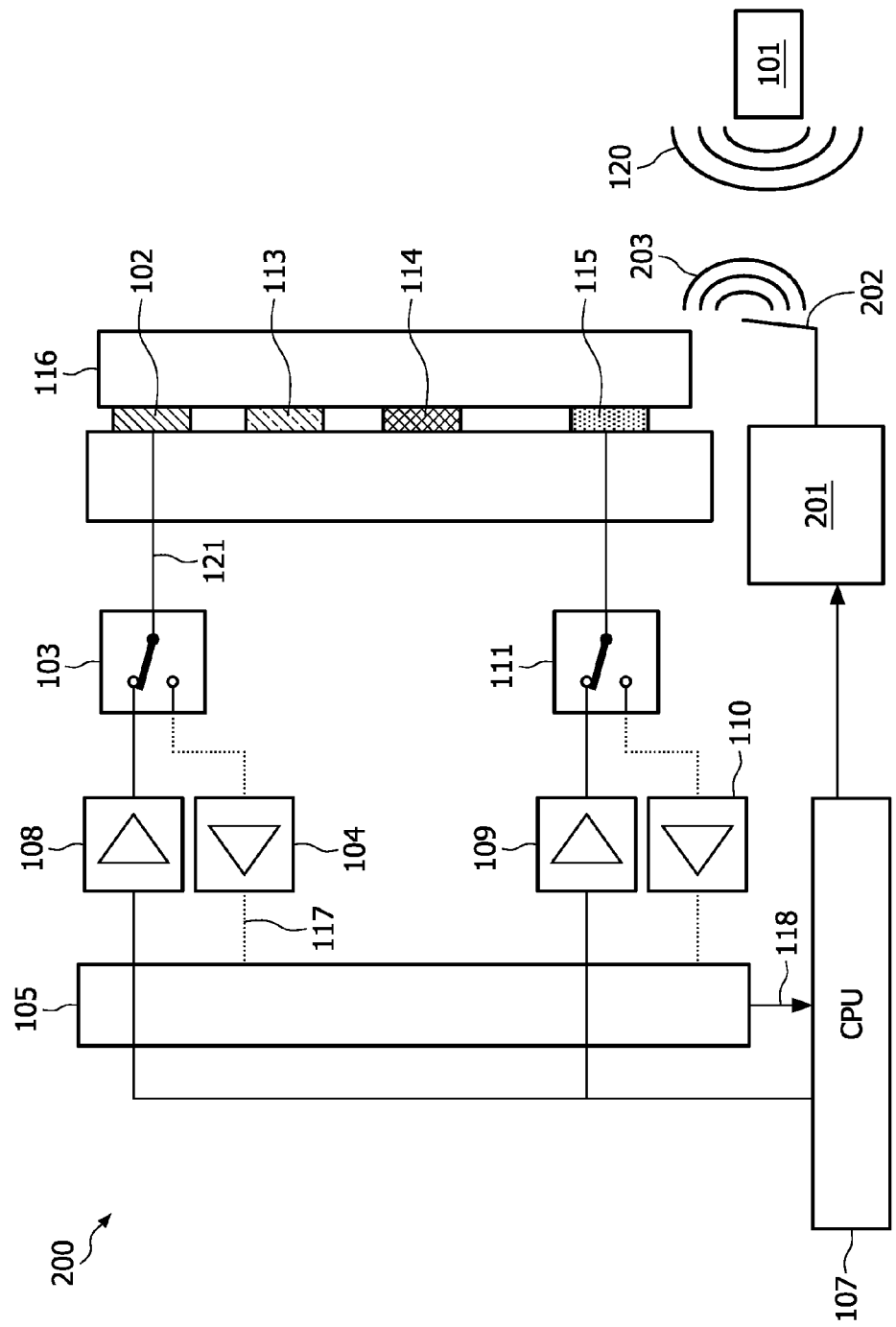
FIG. 2 shows a schematic representation of the building blocks of a lighting system according to another exemplary embodiment of the present invention.

Furthermore, the modulated light (or radio frequency signal as depicted in FIG. 2) is used for the downlink, i.e. the signal transmission from the lighting system to the remote control 101.

Therefore, the current working condition may be transmitted to the remote control 101 by a downlink communication signal. The signal may then be used for programming or controlling a further lighting system. The communication signal may comprise static and dynamic colour point information. It should be noted in this context, that dynamic means complex dependency on a time. Furthermore, the communication signal may comprise dimmer or switch control information.

The communication signal may further comprise a network item, which is a lamp identification signal, useful for example when several lamps are present in an installation and when all lamps should be controlled by the same remote control. In this case, about a plurality of lighting systems may be grouped to a lamp network.

Furthermore, the communication signal may comprise start-/stop information of local scenes, e.g. local dynamic patterns, attendance simulation, etc.

Furthermore, the communication may comprise a lamp-identification number or use-patterns, like on/off-time or the preferred colour at a certain time.

The lighting system may be applied in connection with phosphor-converted LEDs (pcLEDs) or conventional LEDs, such as GaN LEDs or AlGaAs LEDs.

FIG. 2 shows a schematic representation of a lighting system according to another exemplary embodiment of the present invention. The lighting system 200 of FIG. 2 comprises a radio frequency module 201 having an antenna 202. The RF-module 201 is adapted for transmitting and/or receiving electromagnetic waves 203 to the remote control device 101. The electromagnetic waves 203 may comprise the communication signal for the remote control 101.

The essential difference of the setup depicted in FIG. 2 with respect to the setup depicted in FIG. 1 is that the downlink (from the lighting system to the remote control 101) may be provided by the RF-module 201. Thus, the CPU 107 is connected to the RF-module 201, which are adapted for generating communication signals on the basis of ZigBee or WLAN in order to communicate with the remote control 101 or with a control station between the remote control and the lighting system 100.

It should be noted however, that the lighting system may comprise both, the RF-module 201 and the pulse-pattern generator 106. Thus, the communication signal may be transmitted by both the LEDs and the RF-module, thereby providing for a redundancy.

Figure 3:
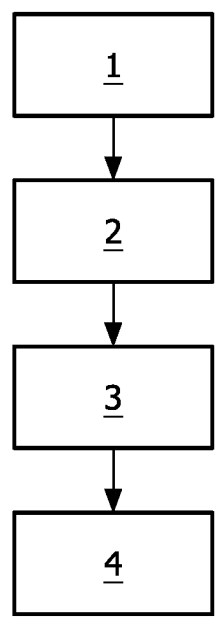
FIG. 3 shows a flow-chart according to a method according to an exemplary embodiment of the present invention.

FIG. 3 shows a flow-chart of an exemplary method according to the present invention. The method starts at step 1 with the emission of light by a light emitting element. Then, in step 2, the light emitting element is switched from an emission mode to a detection mode by a switching element. At step 3, a control signal, which is transmitted from a remote control device, is detected by the light emitting element. In step 4, the detected signal is transferred to a central processing unit, where it is analyzed. The central processing unit then generates, together with a pulse-pattern generator, a corresponding driving signal for the light emitting element. In a fourth step, a communication signal is generated by the CPU together with the pulse-pattern generator and emitted by the light emitting element towards the remote control. The communication signal corresponds, for example, to the current working condition of the light emitting element and may comprise an identification number of the light emitting element.

The invention may be applied for remote controlling of general lighting, for communication between light units (optical long range link), for a touch-pad replacement for displays with LED backlighting, for optical proximity sensors and for automotive applications, such as light keys.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A lighting system for communication with remote control device:
   a lighting system adapted for emitting light for illumination and transmitting a communication signal to a remote control device;
   the lighting system operable to detect a control signal from the remote control device;
   a light emitting element including at least one light emitting diode;
   wherein the at least one light emitting diode is adapted for an integrated light emitting function to emit light both for illumination and for transmitting the communication signal to the remote control device;
   the at least one light emitting diode having the integrated light emitting function further adapted to
   detect a control signal from the remote control device;
   an amplifier for receiving the control signal and electronically connected to a digital converter, the digital converter in communication with a processor;
   a switching element for switching the at least one light emitting diode between a detection mode and an emission mode.

2. The lighting system of claim 1, wherein the communication signal comprises information relating to a working condition of the light emitting element.

3. The lighting system of claim 1, wherein the communication signal comprises information related to at least one attribute of the light emitting element selected from the group consisting of static colour point information, dynamic colour point information, a dimmer control signal, a start signal, a stop signal, an identification signal, a use-pattern signal, and power consumption rate.

4. The lighting system of claim 1, wherein the control signal comprises data for setting at least one attribute of the light emitting element selected from the group consisting of static colour point information, dynamic colour point information, a dimmer control signal, a start signal, a stop signal, a lamp identification signal and the maximum allowed power consumption rate.

5. The lighting system of claim 1, wherein the lighting system further comprises a modulation unit adapted for modulating the communication signal according to a modulation scheme.

6. The lighting system of claim 5, wherein the modulation scheme is selected from the group consisting of: pulse width modulation, pulse position modulation, pulse amplitude modulation, and pulse density modulation.

7. The lighting system of claim 1, further comprising a transmission unit for emitting the communication signal to the remote control device; wherein the transmission unit comprises a radio frequency transmitter module.

8. The lighting system of claim 1, wherein the light emitting element comprises at least one string of serially-connected light emitting diodes or laser devices.

9. The lighting system of claim 1, further comprising:
an amplifier; and
a driving circuit;
wherein the switching element is a transmit-/receive-switch adapted for providing a disconnection of the light emitting element from the driving circuit and a connection of the light emitting element to the amplifier.

10. A communication and switching circuit for a remotely controllable lighting system comprising:
a light emitting element including at least one light emitting diode configured to both emit light in an emission mode and detect a control signal from a remote control device in a detection mode;
said communication and switching circuit configured for generating a communication signal for a remote control device and further including
a switching element for switching the light emitting element between said detection mode and said emission mode;
a driving circuit for driving said light emitting element such that said light emitting element emits light when in said emission mode; and
a sampling circuit for sampling of said control signal detected by said light emitting element when in said detection mode.

11. The communication and switching circuit of claim 10, wherein the sampling circuit includes an amplifier and an analog-to-digital converter.

12. The communication and switching circuit of claim 10, further comprising a processor and a pulse-pattern generator for generating the communication signal.

13. A method for communication between a lighting system with a remote control device, comprising:
emitting light for illumination by a light emitting element including at least one diode, and
detecting a control signal from a remote control device by the emitted by the light emitting element,
switching the light emitting element from an emission mode to a detection mode;
emitting a communication signal to the remote control device by the light emitting element.

* * * * *